United States Patent
Ota et al.

(10) Patent No.: US 6,199,964 B1
(45) Date of Patent: Mar. 13, 2001

(54) BRAKING CONTROL SYSTEM FOR AN AUTOMOTIVE VEHICLE

(75) Inventors: Toshinobu Ota, Ama-gun; Yosuke Takahira, Toyota, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/185,578

(22) Filed: Nov. 4, 1998

(30) Foreign Application Priority Data

Nov. 8, 1997 (JP) .................................................. 9-322130

(51) Int. Cl.$^7$ ........................................................ B60T 8/00
(52) U.S. Cl. ........................... 303/192; 303/191; 303/166
(58) Field of Search ................................... 303/192, 191, 303/143, 145, 24.1, 142, 141, DIG. 6, 166, 135, 125, 190, 9.62, 89, 113.5, 146, 139, 140, 147, 113.2, 113.3; 477/901, 189–191, 194–198, 40, 93, 116; 188/DIG. 1, 265, 353, 181 T; 180/169, 287, 179, 249, 176; 192/219.1, 219.4; 701/89, 78, 80, 90

(56) References Cited

U.S. PATENT DOCUMENTS

| | | | |
|---|---|---|---|
| 4,681,196 | * 7/1987 | Fulmer et al. | 303/191 |
| 4,717,207 | * 1/1988 | Kubuta et al. | 188/353 |
| 5,052,531 | * 10/1991 | Bota | 192/219.1 |
| 5,125,485 | * 6/1992 | Lang | 303/192 |
| 5,452,946 | * 9/1995 | Warner . | |
| 5,484,044 | * 1/1996 | Bursteinas et al. | 188/DIG. 2 |
| 5,547,264 | 8/1996 | Tozu et al. . | |
| 5,624,164 | 4/1997 | Tozu et al. . | |
| 5,741,200 | * 4/1998 | Taniguchi et al. | 477/901 |
| 5,820,515 | * 10/1998 | Fukaya et al. . | |
| 5,826,954 | 10/1998 | Schmitt et al. . | |
| 5,916,062 | * 6/1999 | Siepker | 303/191 |
| 5,978,726 | * 11/1999 | Takeda et al. | 303/143 |
| 5,984,429 | * 11/1999 | Nell et al. | 303/155 |
| 6,009,987 | * 1/2000 | Zechmann et al. | 188/353 |

FOREIGN PATENT DOCUMENTS

| | | |
|---|---|---|
| 19525552 | 1/1997 | (DE) . |
| 19611360 | 9/1997 | (DE) . |
| 19711515 | 10/1997 | (DE) . |
| 63-17161 | 1/1988 | (JP) . |
| 9-58429 | 3/1997 | (JP) . |
| 9702969 | * 1/1997 | (WO) . |

* cited by examiner

*Primary Examiner*—Douglas C. Butler
(74) *Attorney, Agent, or Firm*—Burns, Doane, Swecker & Mathis, LLP

(57) ABSTRACT

The present invention is directed to a braking control system for controlling a braking force applied to each wheel of a vehicle. A steep slope detector GD is provided for determining whether the vehicle is on a steep slope, when the rear end of the vehicle is located downward. The wheel speeds of rear wheels RR, RL are held to be zero by a stop holding device SH which is adapted to supply the hydraulic braking pressure discharged from an auxiliary pressure source AS to the rear wheel brake cylinders RR, RL, when the steep slope detector GD determines that the vehicle is on the steep hill, with the rear end of the vehicle located downward, and a braking operation sensor BD detects the depression of the brake pedal BP, with the rear end of the vehicle located downward, and when it is determined that the wheel speeds of front wheels FR, FL are zero and that the wheel speeds of the rear wheels RR, RL are not zero. And, the hydraulic braking pressure in the rear wheel brake cylinders Wrr, Wrl is decreased by a stop cancellation device RH in response to the operating conditions of the brake pedal BP, when the vehicle is moved after the wheel speeds of the rear wheels RR, RL became zero.

6 Claims, 12 Drawing Sheets

BRAKING CONTROL SYSTEM FOR AN AUTOMOTIVE VEHICLE

BACKGROUND OF THE INVENTION

1. Field of the Invention

The present invention relates to a braking control system for controlling a braking force applied to each of wheels of an automotive vehicle, and more particularly to the braking control system which holds the vehicle in its stopped state, when the vehicle stops on a steep slope.

2. Description of the Related Arts

In general, when a moving vehicle is braked, axle loads applied to the front and rear portions of the vehicle respectively will be different from each other due to the moving load caused by the braking operation. Therefore, the braking force applied to front wheels and the braking force applied to rear wheels for locking all of the wheels simultaneously are not in direct proportion to each other,, but in such a relationship as called an ideal braking force distribution, which may be varied depending upon the presence or absence of the load on the vehicle. If the braking force applied to the rear wheels exceeds the braking force applied to the front wheels, the directional stability of the vehicle will be deteriorated. In order to keep the braking force applied to the rear wheel lower than that applied to the front wheel and provide a distribution in close proximity to the ideal braking force distribution, a proportioning valve is provided between the rear wheel brake cylinders and a master cylinder. According to this arrangement, the distribution characteristic has a pair of lines having different gradients from each other. When the difference of the loads applied to the inner and outer wheels of a turning vehicle is taken into consideration for example, it is necessary to reduce the braking force applied to the rear wheels much lower than the braking force applied to the front wheels. Therefore, in the case where it is so arranged that the hydraulic braking pressure is always restricted by the proportioning valve, the braking force distributed to the rear wheels will be reduced, so that a large depressing force to a brake pedal will be needed to ensure a desired deceleration, and an excessive load will be applied to the front wheels.

In order to solve the problem as described above, U.S. Pat. No. 5,624,164 discloses a braking force distribution control system, which is adapted to control the braking force applied to the rear wheel in a predetermined relationship with the braking force applied to the front wheel, by controlling pressure control valves disposed between the wheel brake cylinder and a hydraulic booster or the master cylinder, and controlling a changeover valve disposed upstream of the control valves.

An ordinary passenger vehicle has a pair of wheels at each of its front and rear sides. Either the front wheels or the rear wheels of that vehicle are operatively connected with an engine to be driven directly thereby, while the rest of the wheels are not connected with the engine so as to be served as non-driven wheels. A vehicle having the driven wheels at its front side is called a front drive vehicle, while a vehicle having the driven wheels at its rear side is called a rear drive vehicle. And, a vehicle having the driven wheels at both of the front and rear sides is called a four-wheel drive (4WD) vehicle. As for a driving system of the four-wheel drive vehicle, various types of the system are known, such as a part time system, full time system, and the like. According to the full time system, all of the front and rear wheels are connected through a front differential gear, a rear differential gear, and a center differential gear.

According to the above-described part time system of the four-wheel drive vehicle, when the vehicle turns with its four wheels driven, its cornering maneuver is difficult due to a rotational difference between the front and rear wheels. This is called a phenomenon of tight corner braking. According to the full time system of the four-wheel drive vehicle, the driving force transmitted to the wheels through a transmission is effectively distributed to the front and rear wheels by the center differential gear, and the rotational difference between the front and rear wheels is compensated, so that a smooth cornering maneuver can be ensured. However, the center differential gear will cause another problem. That is, if one of the front and rear wheels slips to rotate freely, the driving force will not be transmitted to the rest of the wheels at all. In order to avoid this, a center differential locking mechanism for locking the center differential gear manually has been introduced.

Thus, from the view point of the braking force distribution, the hydraulic braking pressure in the rear wheel brake cylinder is restricted by the proportioning valve, or it is controlled by the pressure control valves in accordance with the predetermined relationship in the apparatus as disclosed in U.S. Pat. No. 5,624,164. According to the vehicle having the braking force distribution system as described above, when the vehicle i; moving upward on a steep slope, the actual braking force distribution will be switched from the normal braking force distribution to the one, in which the load to the rear wheels located downward will be larger than the load to the front wheels. In this case, however, if the vehicle is braked, the braking force distributed to the rear wheels will be reduced by the above-described distribution system. As a result, when the vehicle moving upward on the steep slope is to be stopped, it will be caused that the wheel speed of the rear wheel will not become zero, while the wheel speed of the front wheel will become zero. Especially on a rough and steep slope, the vehicle is hardly held to be in its stopped state at a desired position. Also, in the case where the vehicle is moving downward on the steep slope, with its rear end positioned downward, i.e., moving in the reverse direction, and then stopped on the steep slope, the situation will be similar to the one in the above case. In these cases, the depressing force may be increased to apply the sufficient braking force to the rear wheels. Depending upon the gradient of the steep slope, however, a quite large depressing force will be needed, so that a large load will be applied to the braking apparatus for the front wheels which are already held to be in the stopped state.

According to the apparatus as disclosed in U.S. Pat. No. 5,624,164, the hydraulic braking pressure in the rear wheel brake cylinders can be regulated to provide the predetermined relationship by controlling the pressure control valves. However, the apparatus is basically the one for restricting the hydraulic braking pressure in the rear wheel brake cylinders, so that a specific countermeasure will be needed in such an unusual situation that the vehicle is stopped when it is moving upward on the steep slope, or stopped when it is moving backward on the steep slope with its rear end positioned downward. Furthermore, in the case where the vehicle is restarted after it was stopped on the rough and steep slope for example, if the braking force is released suddenly, the motion of the vehicle will become unstable. In this case, therefore, the braking force will have to be released gradually, to restart the vehicle's movement slowly.

According to the full time system of the four-wheel drive vehicle, however, if the center differential gear is locked by the center differential locking mechanism, the phenomenon of tight corner braking will be caused, as described before. As a result, the vehicle's cornering maneuver will be difficult. As a countermeasure against this, simply removing the center differential locking mechanism will need another countermeasure, when one of the wheels will slip to rotate freely, as described before. Furthermore, if the center differential locking mechanism is removed, a further countermeasure will be needed in such conditions as follows. That is, in the case where the vehicle is stopped when it is moving upward on the steep slope, or stopped when it is moving backward on the steep slope, with its rear end positioned downward, even if the vehicle is of the four-wheel drive type, it will be caused that the wheel speeds of the rear wheels will not become zero, while the wheel speeds of the front wheels will become zero, without the center differential locking mechanism, so that it will be difficult to hold the vehicle in its stopped state at a desired position. Furthermore, in the case where the vehicle is restarted after it was stopped on the rough and steep slope, the braking force will have to be released gradually, to restart the vehicle slowly.

SUMMARY OF THE INVENTION

Accordingly, it is an object of the present invention to provide a braking control system for an automotive vehicle, wherein the vehicle is effectively held to be in its stopped state at a desired position, in the case where the vehicle is stopped when it is moving upward on a steep slope, or stopped when it is moving backward on the steep slope with its rear end positioned downward, and the braking force is gradually released to move the vehicle appropriately, in the case where the vehicle is restarted after it was stopped on the steep slope.

It is another object of the present invention to provide the braking control system applicable to a four-wheel drive vehicle having a center differential gear.

In accomplish the above and other objects, a braking control system is provided for controlling a braking force applied to each of front and rear wheels of an automotive vehicle. Front wheel brake cylinders are operatively mounted on the front wheels for applying the braking force thereto, respectively. Rear wheel brake cylinders are operatively mounted on the rear wheels for applying the braking force thereto, respectively. A pressure generator is provided for pressurizing brake fluid in response to operation of a manually operated member to generate a hydraulic braking pressure and supply the hydraulic braking pressure to each of the front and rear wheel brake cylinders. An auxiliary pressure source is provided for pressurizing the brake fluid irrespective of operation of the manually operated member to generate a power pressure. And, a braking operation detector is provided for detecting the operation of the manually operated member and the operating conditions thereof. A wheel speed detector is provided for detecting wheel speeds of the front and rear wheels of the vehicle. A steep slope detector is provided for determining whether the vehicle is on a steep slope, when the rear end of the vehicle is located downward. Then, a stop holding device is provided for holding the wheel speeds of the rear wheels to be zero by supplying the hydraulic braking pressure discharged from the auxiliary pressure source to the rear wheel brake cylinders, when the steep slope detector determines that the vehicle is on the steep slope, with the rear end of the vehicle located downward, and the braking operation detector detects the operation of the manually operated member, and when it is determined on the basis of the wheel speeds detected by the wheel speed detector that the wheel speeds of the front wheels are zero and that the wheel speeds of the rear wheels are not zero. And, a stop cancellation device is provided for decreasing the hydraulic braking pressure in the rear wheel brake cylinders in response to the operating conditions of the manually operated member detected by the braking operation detector, when the vehicle is moved after the wheel speeds of the rear wheels became zero.

It is preferable that the pressure generator includes a static pressure generator for pressurizing the brake fluid in response to operation of the manually operated member to generate a static hydraulic pressure and supply the static hydraulic pressure to the front wheel brake cylinders, and a dynamic pressure generator for regulating the power pressure discharged from the auxiliary power source to generate a dynamic hydraulic pressure in response to operation of the manually operated member and supply the dynamic hydraulic pressure to the rear wheel brake cylinders. And, the stop holding device may include a changeover device for selectively placing one of a first operating position for communicating the rear wheel brake cylinders with the dynamic pressure generator, and a second operating position for communicating the rear wheel brake cylinders with the auxiliary pressure source. The changeover device is adapted to normally place the first operating position, and place the second operating position to supply the power pressure discharged from the auxiliary power source to the rear wheel brake cylinders, and keep the wheel speeds of the rear wheels to be zero, when the steep slope detection means determines that the vehicle is on the steep slope, with the rear end of the vehicle located downward, and the braking operation detector detects the operation of the manually operated member, and when it is determined on the basis of the wheel speeds detected by the wheel speed detector that the wheel speeds of the front wheels are zero and that the wheel speeds of the rear wheels are not zero.

The braking operation detector may include a pressure detector for detecting the hydraulic pressure output from the static pressure generator, and the braking operation detector is adapted to detect the operating conditions of the manually operated member in response to a varying rate of the hydraulic pressure output from the static pressure generator and detected by the pressure detector. The steep slope detector may include a tilt detector for detecting a tilt angle of the vehicle, and may be adapted to determine that the vehicle is on the steep slope, when the tilt detector detects the tilt angle tilted more than a predetermined angle for a predetermined period of time.

The above-described braking control system may be applied to a four-wheel drive vehicle having a front differential gear connected to the front wheels, a rear differential gear connected to the rear wheels, and a center differential gear connected to the front and rear differential gears.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
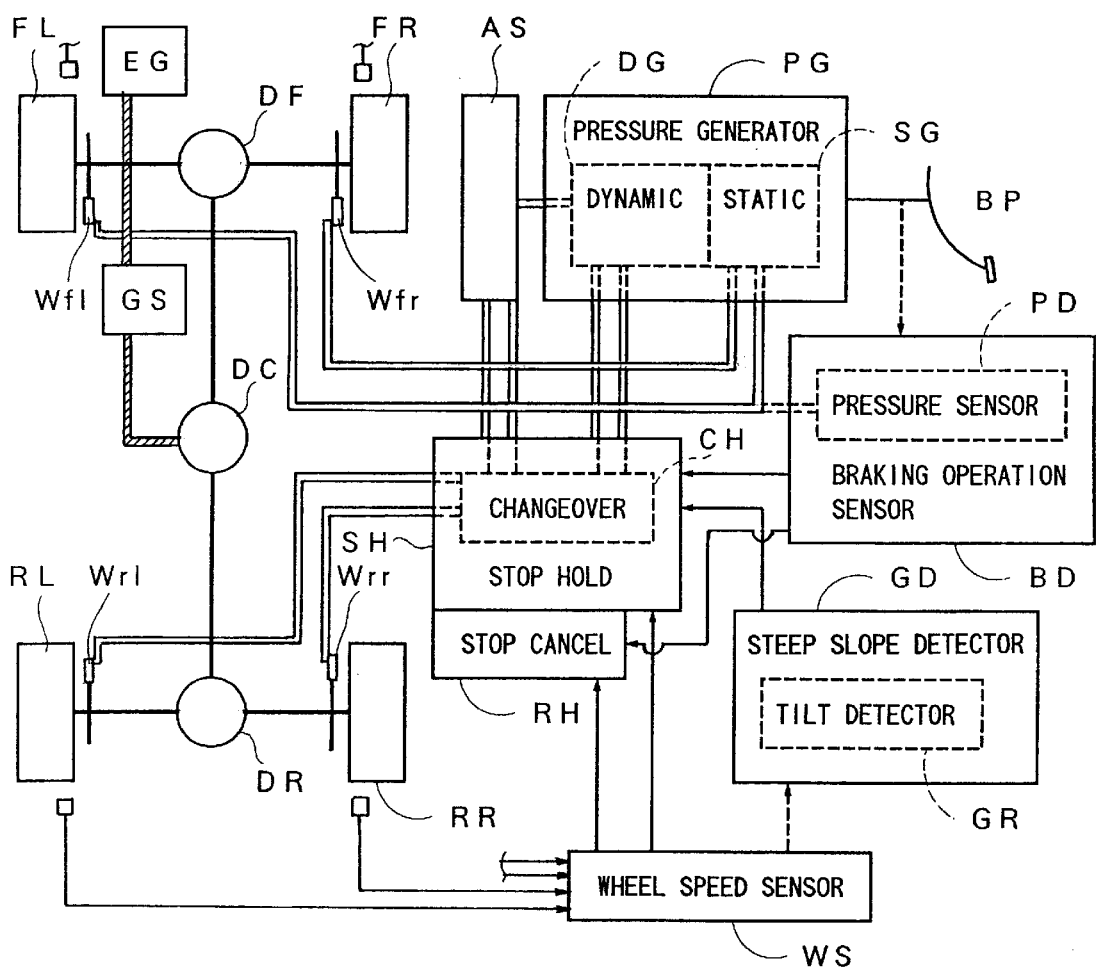
FIG. 1 is a general block diagram illustrating a braking control system according to an embodiment of the present invention.

Referring to FIGS. 1–11, there is schematically illustrated a braking control system of a four-wheel drive vehicle, which is applicable to a front drive vehicle and a rear drive vehicle. The vehicle has a front differential gear DF which is connected to front wheels FL, FR, a rear differential gear DR which is connected to rear wheels RL, RR, and a center differential gear DC which is connected to the front and rear differential gears DF, DR. However, the vehicle is not provided with a differential locking mechanism. Therefore, it is so arranged in the four-wheel drive vehicle as shown in FIG. 1 that a driving force of an engine EG is output from a transmission GS, and transmitted to each wheel through the center differential gear DC, and then the front and rear differential gears DF, DR.

Referring to FIG. 1, front wheel brake cylinders Wfr, Wfl are operatively mounted on the front wheels FR, FL so as to apply the braking force thereto, respectively, and rear wheel brake cylinders Wrr, Wrl are operatively mounted on the rear wheels RR, RL so as to apply the braking force thereto, respectively. A pressure generator PG is provided for pressurizing brake fluid in response to operation of a brake pedal BP, which serves as the manually operated member, to generate a hydraulic braking pressure and supply the same to each of the front and rear wheel brake cylinders. An auxiliary pressure source AS is provided for pressurizing the brake fluid irrespective of operation of the brake pedal BP to generate a power pressure. A braking operation sensor BD is provided for detecting the operation of the brake pedal BP and its operating conditions. Wheel speed sensors (represented by WS) are provided for detecting wheel speeds of the wheels. A steep slope detector GD is provided for determining whether the vehicle is on a steep slope, when the rear end of the vehicle is located downward. A stop holding device SH is provided for holding the wheel speeds of the rear wheels RR, RL to be zero by supplying the hydraulic braking pressure discharged from the auxiliary pressure source AS to the rear wheel brake cylinders Wrr, Wrl, when the steep slope detector GD detects that the vehicle is on the steep slope, with the rear end of the vehicle located downward, and the braking operation sensor BD detects the depression of the brake pedal BP, and when it is determined on the basis of the wheel speeds detected by the wheel speed sensor WS that the wheel speeds of the front wheels FR, FL are zero and that the wheel speeds of the rear wheels RR, RL are not zero. And, a stop cancellation device RH is provided for decreasing the hydraulic braking pressure in the rear wheel brake cylinders Wrr, Wrl in response to the conditions of the brake pedal BP detected by the braking operation sensor BD, when the vehicle is moved after the stop holding device SH had the wheel speeds of the rear wheels RR, RL to be zero.

As indicated by a broken line in FIG. 1, the pressure generator PG includes a static pressure generator SG, e.g., a master cylinder, which is adapted to pressurize the brake fluid in response to depression of the brake pedal BP, so as to generate a static hydraulic pressure and supply the static hydraulic pressure to the front wheel brake cylinders Wfr, Wfl, and a dynamic pressure generator DG, e.g., a regulator, which is adapted to regulate the power pressure discharged from the auxiliary power source AS, so as to generate a dynamic hydraulic pressure in response to depression of the brake pedal BP and supply the dynamic hydraulic pressure to the rear wheel brake cylinders Wrr, Wrl, while the static pressure generator SG supplies the static hydraulic pressure to the front wheel brake cylinders Wfr, Wfl. In the present embodiment, the stop holding device SH includes a changeover device CH which is adapted to selectively place one of a first operating position for communicating the rear wheel brake cylinders Wrr, Wrl with the dynamic pressure generator DG, and a second operating position for communicating the rear wheel brake cylinders Wrr, Wrl with the auxiliary pressure source AS. The changeover device CH is adapted to normally place the first operating position, and place the second operating position, when the steep slope detector GD detects that the vehicle is on the steep slope, with the rear end of the vehicle located downward, the braking operation sensor BD detects the depression of the brake pedal BP, and when it is determined on the basis of the wheel speeds detected by the wheel speed sensor WS that the wheel speeds of the front wheels FR, FL are zero and that the wheel speeds of the rear wheels RR, FL are not zero, so as to supply the power pressure discharged from the auxiliary power source AS to the rear wheel brake cylinders Wrr, Wrl, and keep the wheel speeds of the rear wheels RR, RL to be zero.

In the present embodiment, the braking operation sensor BD includes a pressure sensor PD which is adapted to detect the hydraulic pressure output from the static pressure generator SG, and the braking operation sensor BD is adapted to detect the operating conditions of the brake pedal BP in response to a varying rate of the hydraulic pressure output from the static pressure generator SG and detected by the pressure sensor PD. The steep slope detector GD may include a tilt detector GR, as indicated by a broken line in FIG. 1, which is adapted to detect a tilt angle of the vehicle, and it may be adapted to determine that the vehicle is on the steep slope, when the tilt detector GR detects the tilt angle tilted more than a predetermined angle for a predetermined period of time, provided that at least the rear end of the vehicle is located downward. In addition, it may be added as a requisite that an estimated vehicle speed, which is calculated on the basis of the output of the wheel speed sensor WS, exceeds a predetermined speed.

Figure 2:
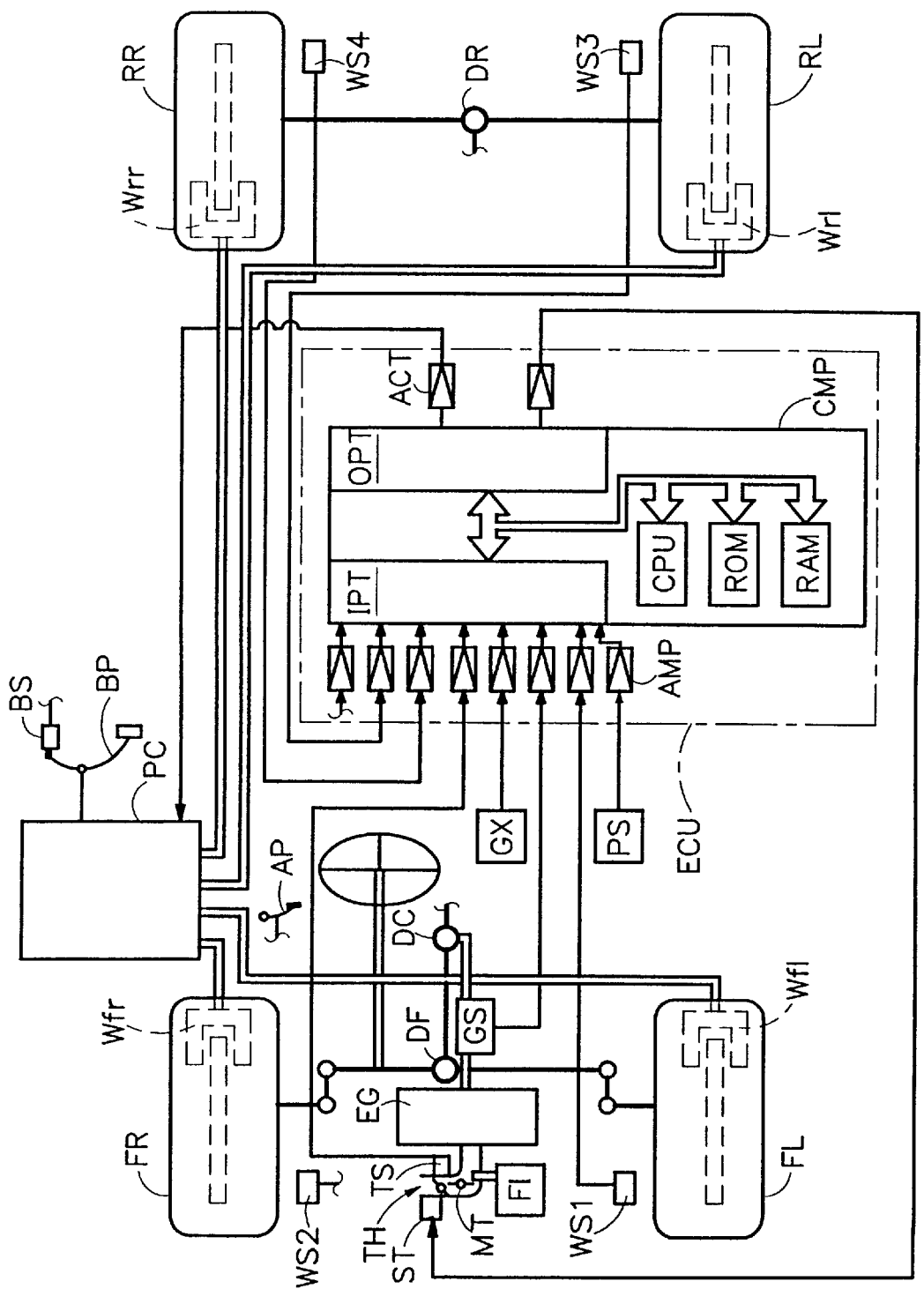
FIG. 2 is a schematic block diagram of a vehicle including the braking control system of the above embodiment.

More specifically, the details of the embodiment disclosed in FIG. 1 are illustrated in FIGS. 2 to 11. As shown in FIG. 2, the engine EG is provided with a fuel injection apparatus FI and a throttle control apparatus TH which is arranged to control a main throttle opening of a main throttle valve MT in response to operation of an accelerator pedal AP. In FIG. 2, the throttle control apparatus TH has a sub-throttle valve ST, which is actuated in response to an output signal of an electronic controller ECU to control a sub-throttle opening. Also, the fuel injection apparatus FI is actuated in response to an output signal of the electronic controller ECU to control the fuel injected into the engine EG. The wheel FL designates the wheel placed at the front left side as viewed from the position of a driver's seat, the wheel FR designates the wheel at the front right side, the wheel RL designates the wheel at the rear left side, and the wheel RR designates the wheel at the rear right side. According to the present embodiment, the engine EG is operatively connected with the front wheels FL, FR through the front differential gear DF, and connected with the rear wheels RL, RR through the transmission GS, center differential gear DC and rear differential gear DR to provide the four-wheel drive system. Therefore, all of the wheels FL, FR, RL, RR are driven wheels.

As shown in FIG. 2, at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. A pressure sensor PS is provided for detecting the hydraulic pressure output from a master cylinder MC, as arranged in FIG. 3. Also provided is a brake switch BS which is turned on when the brake pedal BP is depressed and turned off when the brake pedal BP is released. These are electrically connected to the electronic controller ECU, which also receives from a throttle sensor TS an idle switch signal of ON/OFF signal indicative of an idling range or a driving range, and throttle opening angle signals of the main throttle valve MIT and sub-throttle valve ST. Thus, the operation of the accelerator pedal AP can be detected on the basis of the idle switch signal output from the throttle sensor TS.

There is provided a tilt sensor GX, which detects *a tilt angle of the vehicle to serve as the tilt detection means according to the present invention, and which is electrically connected to the electronic controller ECU. The tilt sensor GX is provided with a weight which is installed to swing back and forth, and adapted to output a signal (GX) indicative of a displacement of the weight moved in accordance with the tilt of the vehicle along the longitudinal axis thereof. On the basis of the signal (Gx), a longitudinal tilt angle of the vehicle Gr is calculated by an equation Gr=K·Gx, where "K" is a constant, provided that the vehicle is parked or stopped. When the vehicle moves, however, the signal (Gx) varies in response to the acceleration of the vehicle, the tilt angle Gr of the vehicle is calculated in accordance with the following equation:

$$Gr(n)=k\cdot Gr(n-1)+(1-k)\cdot K\cdot (Gx-Gw)$$

where "Gr(n−1)" is the tilt angle obtained in the previous cycle, "k" (0<k<1) is a weighing coefficient. "Gw" is a vehicle acceleration, and an estimated vehicle acceleration DVso may be substituted for it. The tilt angle Gr according to the present invention indicates a positive value when the rear end of the vehicle is located downward (i.e., the vehicle goes uphill), whereas it indicates a negative value when the rear end of the vehicle is located upward (i.e., the vehicle goes downhill).

The electronic controller ECU is provided with a microcomputer CMP which includes a central processing unit or CPU, a read-only memory or ROM, a random access memory or RAM an input port IPT, and an output port OPT, and the like, as shown in FIG. 2. The signals detected by each of the wheel speed sensors WS1 to WS4, brake switch BS, acceleration sensor (not shown) and etc. are fed to the input port IPT via respective amplification circuits AMP and then to the central processing unit CPU. The control signals are fed from the output port OPT to the throttle control apparatus TH and hydraulic pressure control apparatus PC via the respective driving circuits (represented by ACT in FIG. 2). In the microcomputer CMP, the read-only memory ROM memorizes a program corresponding to flowcharts shown in FIG. 4 and etc., the central processing unit CPU executes the program while the ignition switch (not shown) is closed, and the random access memory RAM temporarily memorizes variable data needed to execute the program.

Figure 3:
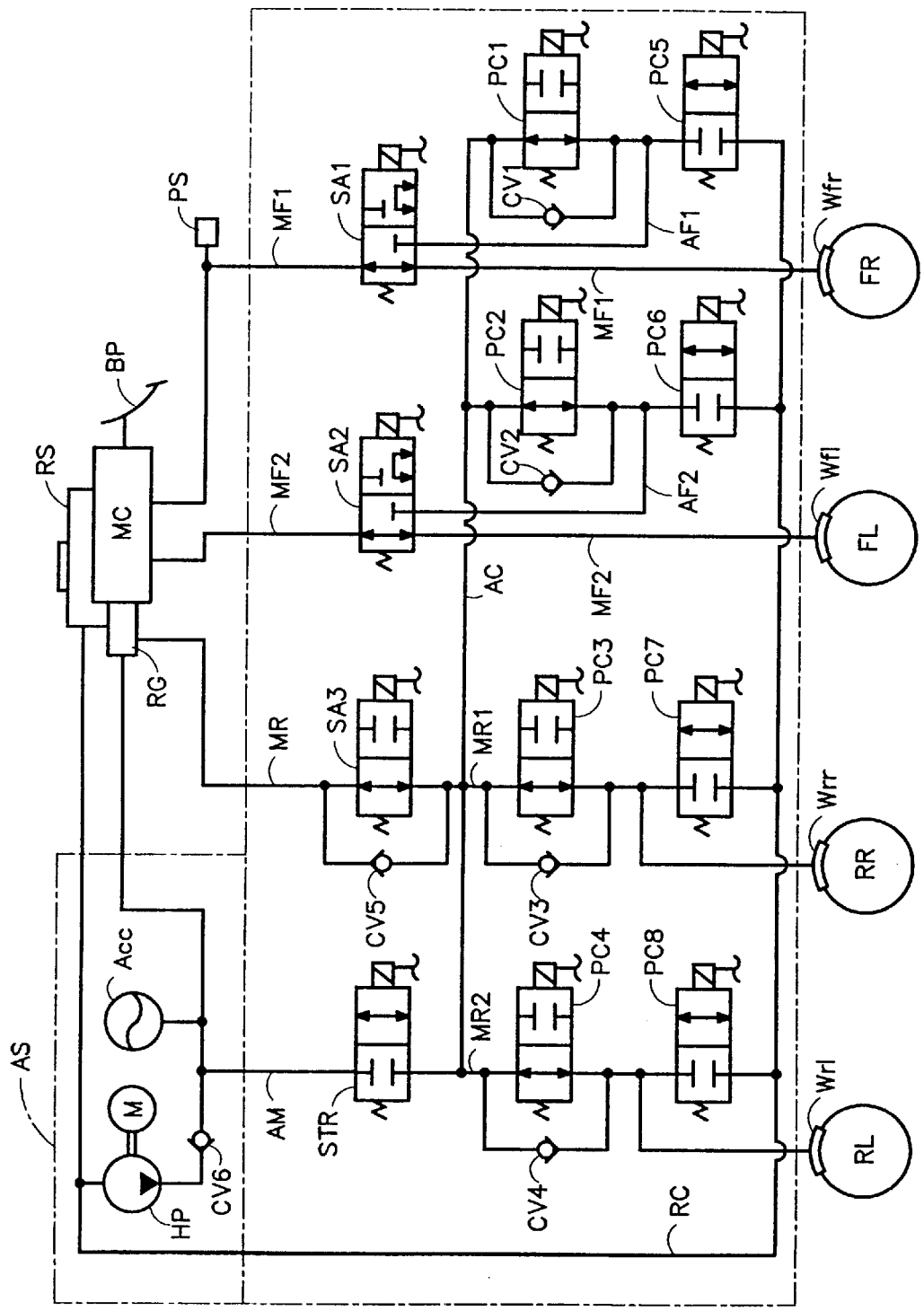
FIG. 3 is a block diagram illustrating an embodiment of a pressure control apparatus for use in the above embodiment.

FIG. 3 shows the hydraulic braking pressure system, wherein the hydraulic circuits are divided into the front hydraulic circuit and the rear hydraulic circuit to form a front and rear dual circuit system according to the present embodiment. A pressure generator for use in the present embodiment includes a master cylinder MC and a regulator RG, which are activated in response to depression of the brake pedal BP. The regulator RG is connected to an auxiliary pressure source AS, both of which are connected to a low-pressure reservoir RS, to which the master cylinder MC is connected, as well. The auxiliary pressure source AS includes a hydraulic pressure pump HP and an accumulator Acc. The pump HP is driven by an electric motor M to pressurize a brake fluid in the reservoir RS to discharge the pressurized brake fluid, or hydraulic braking pressure through a check valve CV6, into the accumulator Acc to accumulate it therein. The electric motor M starts to operate when the pressure in the accumulator Acc is decreased to be less than a predetermined lower limit, and stops when the pressure in the accumulator Acc is increased to exceed a predetermined upper limit. Accordingly, it is so arranged that a so-called power pressure be properly supplied from the accumulator Acc to the regulator RG. The regulator RG introduces the hydraulic braking pressure discharged from the auxiliary pressure source AS and regulates it into a regulator pressure in proportion to a pilot pressure discharged from the master cylinder MC. The structure of the regulator RG is well known in the art, so that explanation thereof is omitted. A part of the regulator pressure is used for assisting the operation of the master cylinder MC.

In hydraulic pressure passages MF1, MF2 for connecting the master cylinder MC with the front wheel brake cylinders Wfr, Wfl, respectively, disposed are solenoid valves SA1 and SA2 which are connected to solenoid valves PC1, PC5 and solenoid valves PC2, PC6, through passages AF1 and AF2, respectively. In the hydraulic pressure passage MF1 (or MF2), the pressure sensor PS is provided for detecting the hydraulic pressure output from the master cylinder MC. The output signal of the pressure sensor PS is input to the electronic controller ECU as shown in FIG. 2, where a master cylinder pressure gradient DPmc indicative of a varying rate of the master cylinder pressure is calculated. A solenoid valve SA3 is disposed in a passage MR which is provided for connecting the regulator RG to the wheel brake cylinders Wrr, Wrl and so on, and which is divided into passages MR1, MR2, in which solenoid valves PC3, PC7 and solenoid valves PC4, PC8 for use in the control of discharging and draining the brake fluid are disposed. Then, the auxiliary pressure source AS is connected to the downstream side of the solenoid valve SA3 through a passage AM, in which a solenoid valve STR is disposed. The solenoid valve STR is of a two-port two-position solenoid operated valve, which is normally closed and activated to communicate the solenoid valves PC1–PC4 directly with the accumulator Acc. Furthermore, a proportioning valve may be provided on the passage MR upstream of the solenoid valve SA3.

With respect to the front hydraulic circuit, the solenoid valves SA1 and SA2 are of a three-port two-position solenoid operated valve which is placed in a first operating position as shown in FIG. 3, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, through the passages AF1, AF2, respectively. The solenoid valves PC1 and PC2 are connected with the solenoid valve STR through a passage AC. The solenoid valves PC5 and PC6 are connected to the reservoir RS through a passage RC. In parallel with the solenoid valves PC1 and PC2, check valves CV1 and CV2 are disposed, respectively. The inlet side of the check valve CV1 is connected to the passage AF1 and the inlet side of the check valve CV2 is connected to the passage AF2. The check valve CV1 is provided for allowing the flow of the brake fluid toward the regulator RG and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the regulator RG. The check valve CV2 is provided in the same manner as the check valve CV1.

With respect to the rear hydraulic circuit, the solenoid valve SA3 is of a two-port two-position solenoid operated valve, which is normally opened as shown in FIG. 3, so that the solenoid valves PC3 and PC4 are communicated with the regulator RG. In this case, the solenoid valve STR is placed in its closed position to shut off the communication with the accumulator Acc. When the solenoid valve SA3 is energized, it is placed in its closed position, where both of the solenoid valves PC3 and PC4 are prevented from communicating with the regulator RG, while the solenoid valves PC3 and PC4 (and, solenoid valves PC1 and PC2) are communicated with the accumulator Acc when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl, respectively. The check valves CV3 and CV4 are provided for allowing the flow of the brake fluid toward the solenoid valve SA3 and preventing the reverse flow. Therefore, when the brake pedal BP is released, the hydraulic pressure in each of the wheel brake cylinders Wrr, Wrl is rapidly reduced to the pressure discharged from the regulator RG. Furthermore, the check valve CV5 is disposed in parallel with the solenoid valve SA3 so that the brake fluid may be supplied from the regulator RG to the solenoid valves PC1–PC4 through the check valve CV5 in response to depression of the brake pedal BP, even when the solenoid valve SA3 is placed in its closed position.

The above-described solenoid valves SA1, SA2, SA3, STR, and PC1–PC8 are controlled by the electronic controller ECU to provide various control modes including the traction control mode, as will be described hereinafter. The motor M drives the pump HP, so that the power pressure is accumulated in the accumulator Acc. The solenoid valves are placed in their normal positions as shown in FIG. 3. When the brake pedal BP is depressed, the master cylinder pressure is discharged from the master cylinder MC, and the regulator pressure is discharged from the regulator RG, and supplied to the wheel brake cylinders Wfr-Wrl through the solenoid valves SA1, SA2, SA3 and PC1–PC4.

When the traction control is initiated to start an anti-slip control operation for the wheel FR under the accelerating operation, for example, the solenoid valve SA1 is changed to its second operating position, and the solenoid valves PC3, PC4 connected to the rear wheel brake cylinders Wrr, Wrl and the solenoid valve SA3 are placed in their closed positions, while the solenoid valves STR and PC1 are placed in their open positions. As a result, the power pressure accumulated in the accumulator Acc is supplied to the wheel brake cylinder Wfr through the solenoid valve STR placed in its open position. Then, if the solenoid valve PC1 is placed in its closed position, the pressure in the wheel brake cylinder Wfr is held. Accordingly, when the solenoid valve PC1 is opened and closed alternately, with the solenoid valve PC5 held in its closed position, the hydraulic braking pressure in the wheel brake cylinder Wfr is increased and held repeatedly like pulses thereby to be increased gradually. If the solenoid valve PC5 is placed in its open position, the wheel brake cylinder Wfr is connected to the reservoir RS through the passage RC, so that the brake fluid in the wheel brake cylinder Wfr is returned to the reservoir RS. Thus, with the solenoid valves PC1 and PC5 opened or closed alternately in response to the slip condition of the wheel FR under the accelerating operation, one of the pressure modes including pressure increase, pressure decrease and hold modes is performed with respect to the wheel brake cylinder Wfr. Whereby, the braking force is applied to the wheel FR to limit its rotating force, so that the accelerating slip is effectively prevented to perform the traction control properly. Likewise, the anti-slip control is performed with respect to the wheel FL. Furthermore, the braking control for the wheels RR, RL to be controlled according to the present embodiment, can be performed with the solenoid valves PC3 and etc. opened or closed alternately. That is, the valves are changed over from their normal positions of the first operating positions as shown in FIG. 3 to the second operating positions, so that the solenoid valve SA3 is placed in the closed condition, and the solenoid valves PC3, PC4, PC7, PC8 are opened or closed alternately, as will be described later in detail.

On the other hand, during the braking operation, when the wheel FR tends to be locked for example, and the anti-skid control is initiated, the solenoid valve SA1 is changed to its second operating position, and the solenoid valve PC1 is placed in its closed position, while the solenoid valve PC5 is placed in its open position. As a result, the brake fluid in the wheel brake cylinder Wfr is drained into the reservoir RS to reduce the pressure in the wheel brake cylinder Wfr. When a gradual increase mode is selected for the wheel brake cylinder Wfr, the solenoid valve PC5 is placed in its closed position and the solenoid valve PC1 is in its open position, so that the regulator pressure is supplied from the regulator RG through the solenoid SA3 and the passage AC, and then the solenoid valve PC1 in its open position and the solenoid valve SA1 in its second position. Then, the solenoid valve PC1 is opened and closed alternately, so that the pressure in the wheel brake cylinder Wfr is increased and held repeatedly like pulses thereby to be increased gradually. When a rapid increase mode is selected for the wheel brake cylinder Wfr, the solenoid valves PC1, PC5 are placed in the normal positions as shown in FIG. 3, and then the solenoid valve SA1 is placed in its first position, so that the master cylinder pressure is supplied from the master cylinder MC. With respect to the rear wheels RR, RL, the solenoid valves PC3, PC4, PC7 and PC8 are operated to perform the anti-skid control in the same manner as described above.

Figure 4:
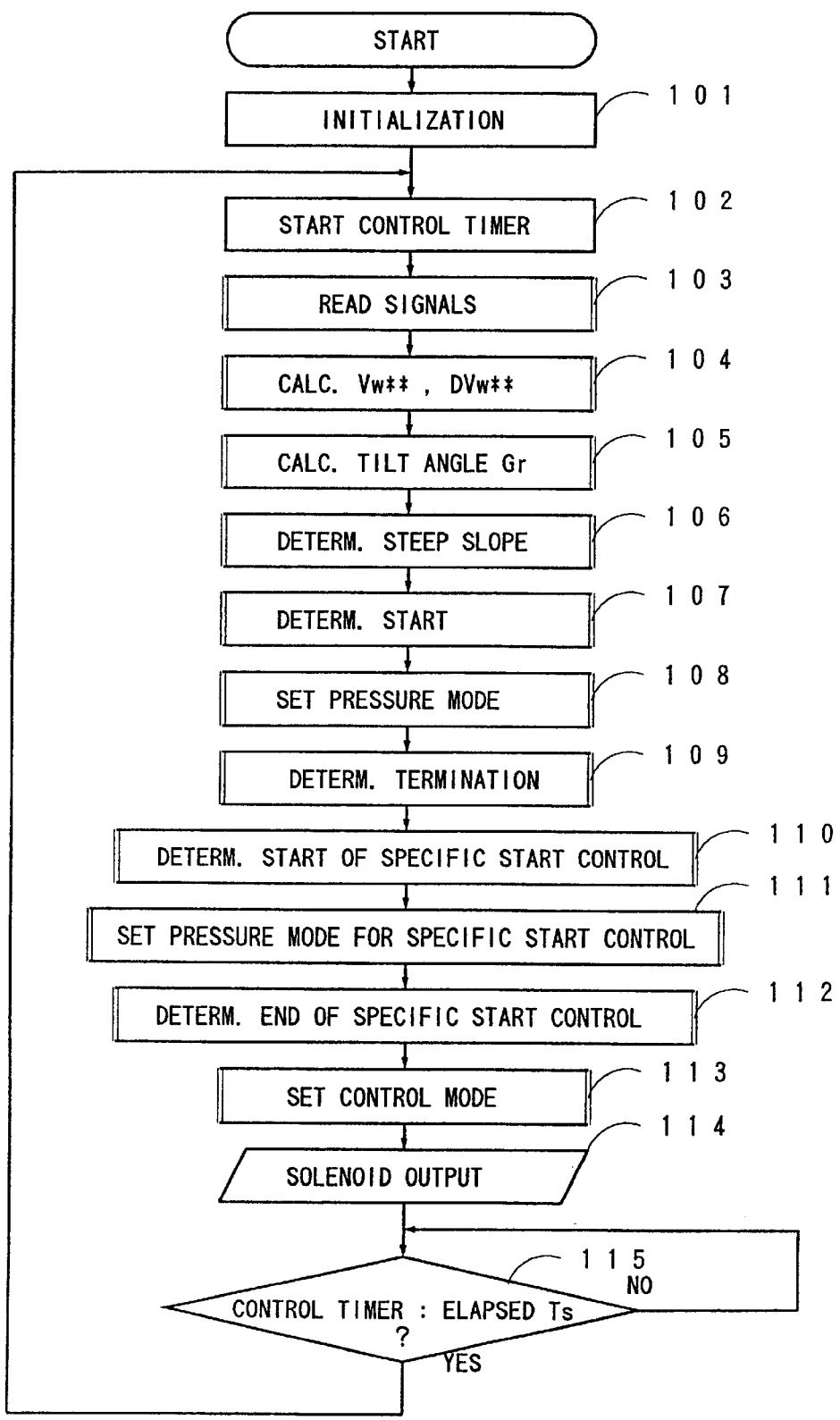
FIG. 4 is a flowchart showing a main routine of the braking control according to the above embodiment of the present invention.

According to the present embodiment as constituted above, a program routine for performing the braking control according to the present embodiment, traction control, anti-skid control and etc. is executed by the electronic controller ECU. FIG. 4 shows a flowchart for the braking control. Its program routine starts when an ignition switch (not shown) is turned on. At Step 101, an initialization of the system at Step 101 is made to clear various data. Then, a control timer is cleared at Step 102 to start counting an elapsed time. And, the signals detected by the wheel speed sensors WS1–WS4, the gear position signal of the transmission GS and the signal detected by the tilt sensor GX are read by the microcomputer CMP at Step 103.

Then, the program proceeds to Step 104 where the wheel speed Vw ( represents one of the wheels FL, FR, RL, RR) of each wheel is calculated on the basis of the signals detected by the wheel speed sensors WS1–WS4, and differentiated to provide the wheel acceleration DVw**. Next, at Step 105, the tilt angle Gr is calculated on the basis of the signal output from the tilt sensor GX. In this respect, the tilt angle Gr according to the present embodiment indicates a positive value when the rear end of the vehicle is located downward, while it indicates a negative value when the rear end is located upward. Then, at Step 106, on the basis of the tilt angle Gr, it is determined whether the road in the vehicle's path is a steep slope. For example, if the tilt angle Gr is equal to or greater than a predetermined value |Kr|, it is determined that the vehicle is on the steep slope, with the rear end of the vehicle located downward.

The program further proceeds to step 107, where it is determined whether the braking control can be initiated with respect to a wheel , i.e., the determination of starting the braking control is made, as will be explained later in detail with reference to FIG. 5. Next, at Step 108, a pressure mode for the braking control to the wheel  is set, as will be explained later in detail with reference to FIG. 6. And, a condition for terminating the braking control is determined at Step 109, as will be explained later in detail with reference to FIG. 7. Furthermore, a condition for initiating a specific control for starting the braking control (hereinafter, referred to as specific start control) is determined at Step 110, and a pressure mode for the specific start control is set at Step 111, and then a condition for ending the specific start control is determined at Step 112 as will be described later in detail with reference to FIGS. 8, 9 and 10. Then, a control mode is set for the wheel ** at Step 113, as will be explained later in detail with reference to FIG. 11. In accordance with the pressure mode, a signal for controlling a solenoid is output at Step 114 thereby to control the wheel brake cylinder pressure. Lastly, the program waits at Step 115 until the control timer which started counting a time at Step 102 will count a predetermined period of time (e.g., 10 ms), and thereafter the program will return to Step 102.

Figure 5:
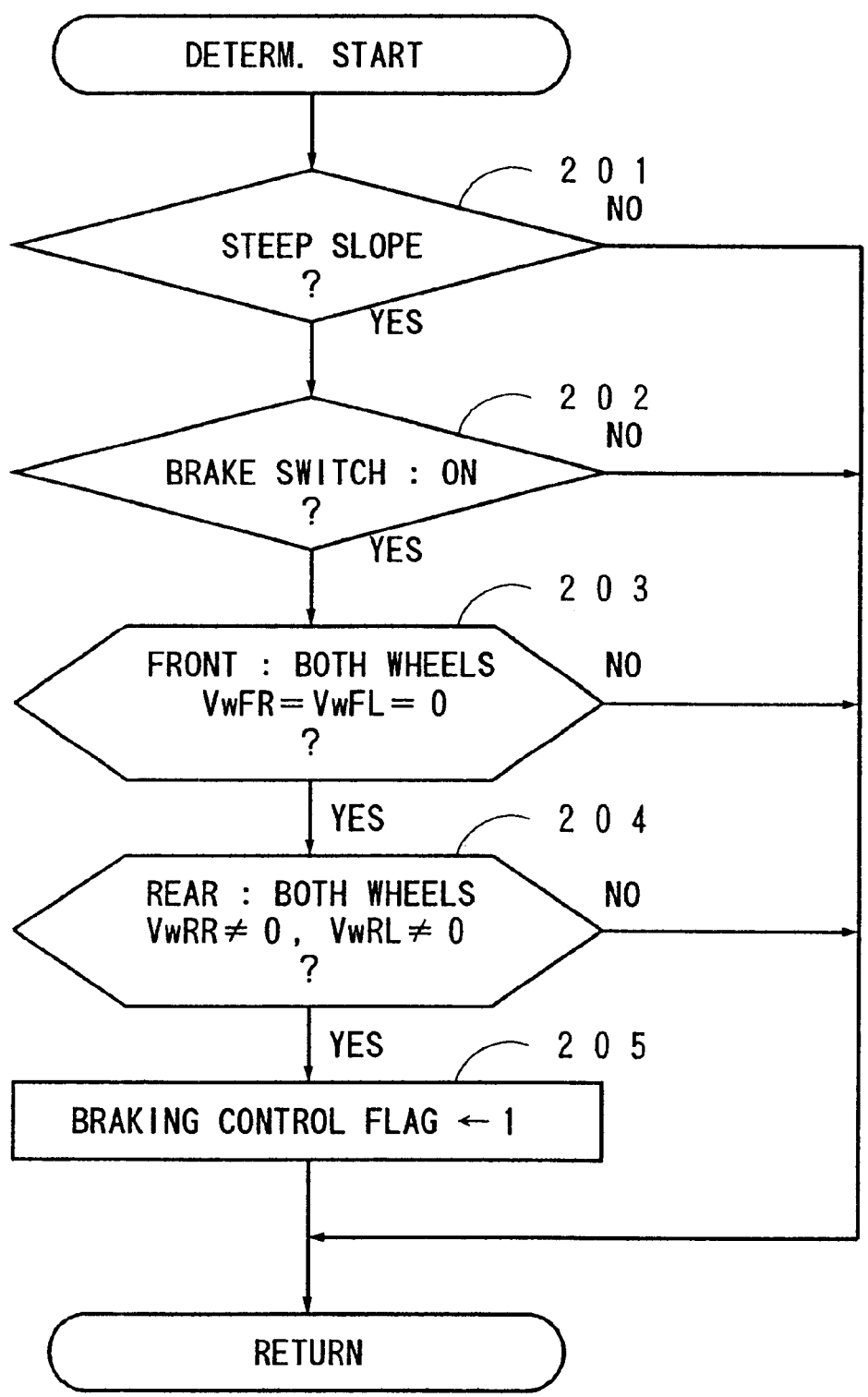
FIG. 5 is a flowchart showing a sub-routine for determining start of the braking control performed in the flowchart as shown in FIG. 4.

FIG. 5 shows the determination of starting the braking control executed at Step 107 in FIG. 4. First, at Step 201, it is determined on the basis of the result of determination at Step 106, whether the vehicle is on the steep slope, and the rear wheels RR, RL are located downward. If it is determined that the vehicle is moving upward on the steep slope, or moving backward, with the rear wheels RR,, RL located downward, the program proceeds to Step 202, where it is determined whether the brake switch BS is on or off. If it is determined that the brake switch BS is on, the program proceeds to Step 203, where it is determined whether all of the wheel speeds VwFR, VwFL of the front wheels FR, FL are zero, or not. If the result is affirmative, the program proceeds to Step 204, where it is determined whether the wheel speeds VwRR, VwRL of the rear wheels RR, RL are zero, or not. If the wheel speeds VwRR, VwRL of the rear wheels RR, RL are not zero, i.e., all of the conditions defined in Steps 201–204 are fulfilled, the program proceeds to Step 205, where the braking control flag is set (1). In the case where any one of the conditions defined in Steps 201–204 are not fulfilled, the program returns to the main routine as it is, so that the braking control will not be performed.

Figure 6:
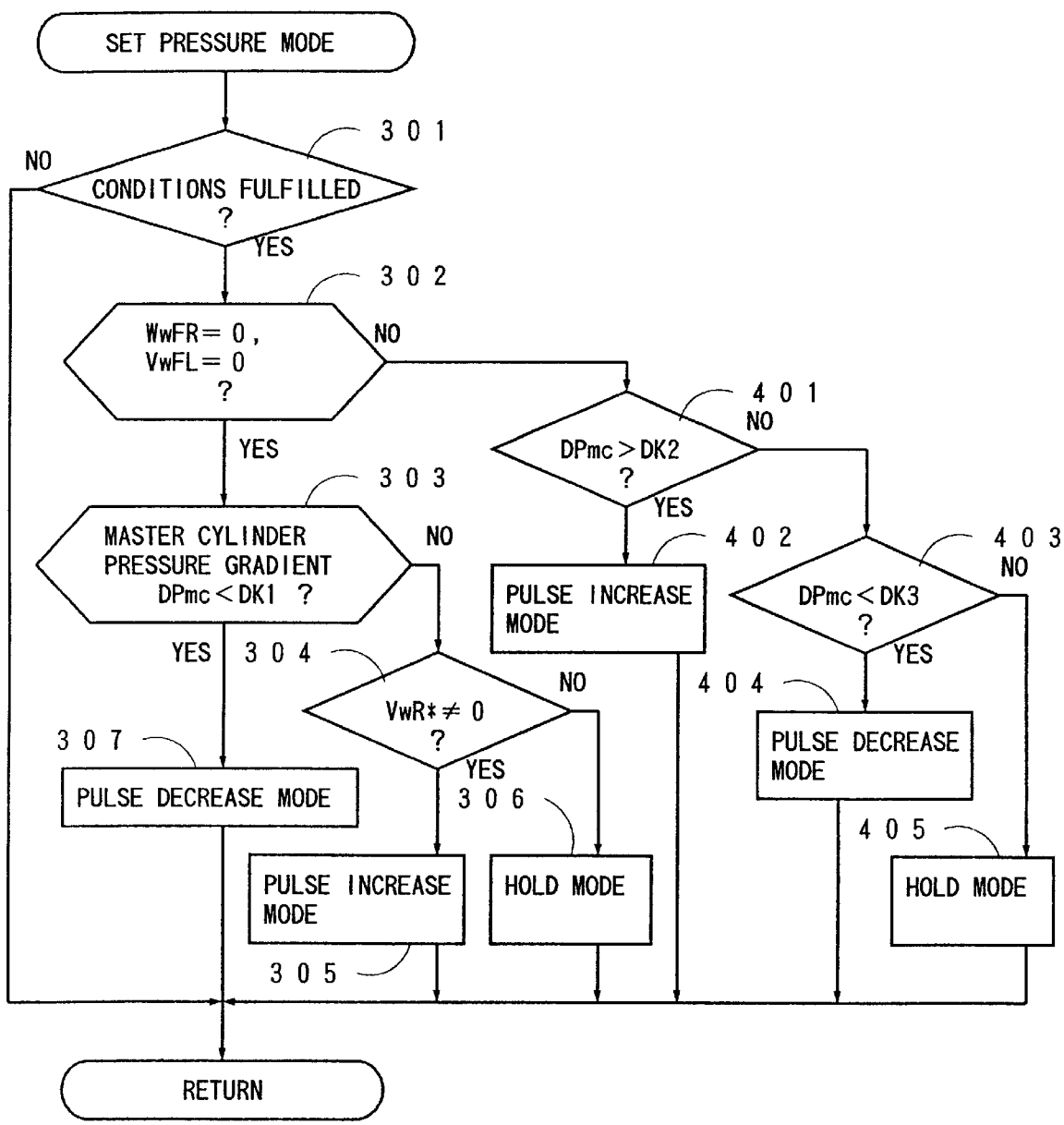
FIG. 6 is a flowchart showing a sub-routine for setting pressure modes for the braking control performed in the flowchart as shown in FIG. 4.

FIG. 6 shows the routine for setting the pressure mode executed at Step 108 in FIG. 4. At the outset, it is determined at Step 301 whether such conditions that the braking control is being made, i.e., the braking control flag is set, and that the specific start control is not being made, have been fulfilled, or not. If the conditions have not been fulfilled, the program returns to the main routine in FIG. 4. If it is determined that the conditions have been fulfilled, the program proceeds to Step 302, where it is determined whether the wheel speeds VwFR, VwFL of the front wheels FR, FL are zero. If the result is affirmative, it indicates that the wheels FR, FL are in their locked conditions, so that the program proceeds to Step 303. It is determined at Step 303 whether the master cylinder pressure gradient DPmc, which is calculated on the basis of the signal detected by the pressure sensor PS, is smaller than a predetermined value DK1 (e.g., −1.0 Mpa/s). If it is equal to or greater than the predetermined value DK1, the program proceeds to Step 304, where the wheel speeds VwRR or VwRL (represented by VwR*) of the rear wheels RR or RL is zero or not. Then, if it is determined at Step 304 that the wheel speeds VwRR or VwRL is not zero, it indicates that the vehicle is in the course of being stopped, so that the pulse increase mode is selected for the rear wheel RR or RL to be controlled, at Step 305. As a result, the solenoid valves PC3, PC4 are opened and closed alternately, the wheel cylinder pressure in the wheel brake cylinder Wrr, Wrl is gradually increased (at Steps 113, 114). If the wheel speeds VwRR or VwRL of the rear wheels RR or RL is zero, it indicates that the vehicle is already in its locked condition, so that the program proceeds to Step 306 where the hold mode is selected to keep its stopped state. If it is determined at Step 303 that the master cylinder pressure gradient DPmc is smaller than the predetermined value DK1, it indicates that the depressing force of the brake pedal BP has been released, so that the program proceeds to Step 307, where the pulse decrease mode is selected for the wheels RR or RL to be controlled, thereby to release the stopped state. That is, the solenoid valves PC7, PC8 are opened and closed alternately, so that the wheel cylinder pressure in the wheel brake cylinders Wrr, Wrl will be reduced gradually (at Steps 113, 114).

If it is determined that both of the wheel speeds VwFR, VwFL of the front wheels FR, FL are not zero, it indicates that the vehicle has been restarted after it was once stopped, so that the program proceeds to Step 401, where it is determined whether the master cylinder pressure gradient DPmc is greater than a predetermined value DK2 (e.g., 0.2

Mpa/s). If it is greater than the predetermined value DK2, it indicates that the brake pedal BP has been depressed additionally, so that the program proceeds to Step 402, where the pulse increase mode is selected for the wheels RR or RL to be controlled. If it is determined that the master cylinder pressure gradient DPmc is equal to or smaller than the predetermined value DK2, the program further proceeds to Step 403, where it determined whether the brake pedal BP has been released to decrease the master cylinder pressure gradient DPmc to be smaller than the predetermined value DK3 (e.g., −0.1 Mpa/s). If it is smaller than the predetermined value DK3, the program proceeds to Step 404, where the pulse decrease mode is selected for the wheels RR or RL to be controlled. If the master cylinder pressure gradient DPmc is equal to greater than the predetermined value DK3, the program proceeds to Step 405, where the hold mode is selected for the wheels RR or RL to be controlled.

Figure 12:
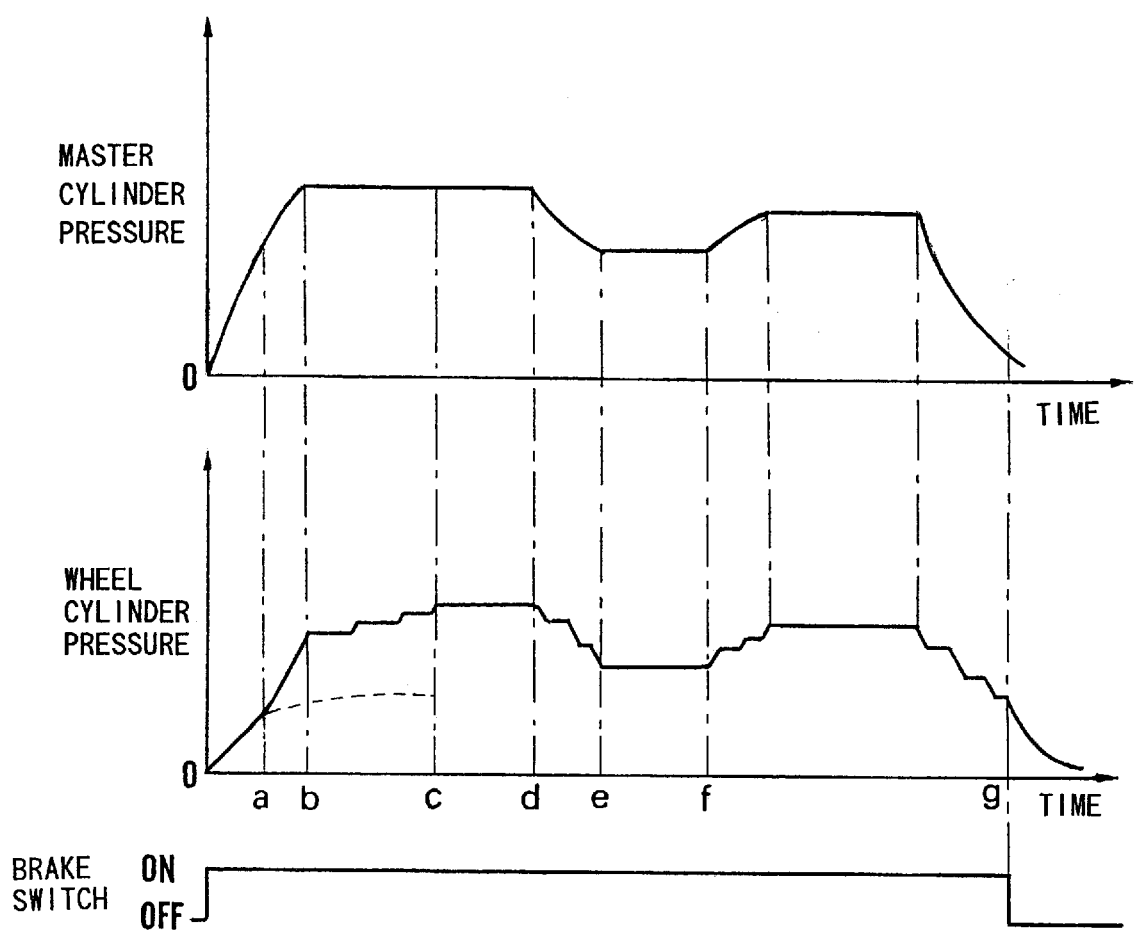
FIG. 12 is a diagram showing an example of the braking control performed according to an embodiment of the present invention.

The above-described controlling operation will be explained with reference to FIG. 12. When the brake pedal BP is depressed, it is determined at a position "a" that the braking control for the wheel RR or RL is to be initiated. Therefore, a rapid increase mode is selected, as described later in detail. As a result, the wheel cylinder pressure in the wheel brake cylinders Wrr, Wrl is rapidly increased as shown in the lower section of FIG. 12. During the period from the position "a" to a position "b", the specific start control is executed in accordance with the routine disclosed in FIGS. 8–10. When it is determined at a position "b" that the wheel speeds VwRR or VwRL of the rear wheels RR or RL is not zero (at Step 304), the pulse increase mode is selected for the rear wheel RR or RL (at Step 305). At a position "c", it is determined that the wheel speeds VwRR or VwRL is zero, and the hold mode is selected (at Step 306). When the depressing force applied to the brake pedal BP is released, the master cylinder pressure is decreased, and when the master cylinder pressure gradient DPmc has become smaller than the predetermined value DK1 at the position "d", the pulse decrease mode is selected for the wheels RR or RL (at Step 307). Then, the master cylinder pressure has become constant at a position "e", and if the master cylinder pressure gradient DPmc is equal to or smaller than the predetermined value DK2, but equal to or greater than the predetermined value DK3, including zero, the hold mode is selected (at Step 405). After the master cylinder pressure is increased, if it is determined at a position "f" that the master cylinder pressure gradient DPmc is greater than the predetermined value DK2, the pressure increase mode is selected (at Step 402). Thereafter, the wheel cylinder pressure in the wheel brake cylinders Wrr, Wrl is controlled to be varied in response to the variation of the master cylinder pressure, until the brake switch BS is turned off at a position "g", where the braking control for the wheels RR, RL is terminated.

Figure 7:
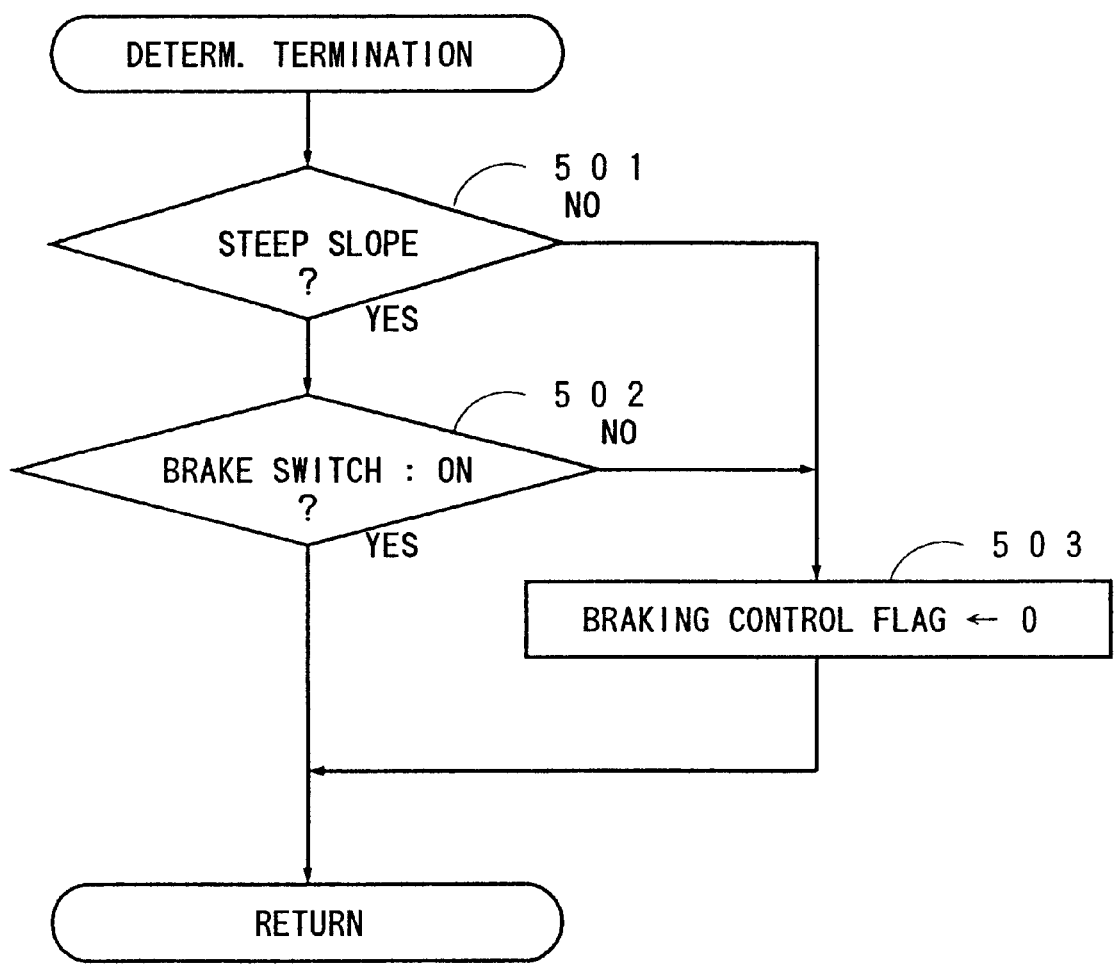
FIG. 7 is a flowchart showing a sub-routine for determining termination of the braking control performed in the flowchart as shown in FIG. 4.

FIG. 7 shows the determination of terminating the braking control executed at Step 109 in FIG. 4. It is determined at Step 501 whether the vehicle is moving upward on the steep slope, or moving backward, with the rear wheels RR, RL placed downward of the slope. If the result is affirmative, the program proceeds to Step 502, where the brake switch BS is on or off. If the brake switch BS is on, the program proceeds to the main routine, and the braking control with respect to the wheel RR or RL is continued. If either the condition at Step 501 or that at Step 502 has not been fulfilled, the program proceeds to Steps 503, where the braking control flag is reset to be zero, and the program returns to the main routine.

Figure 8:
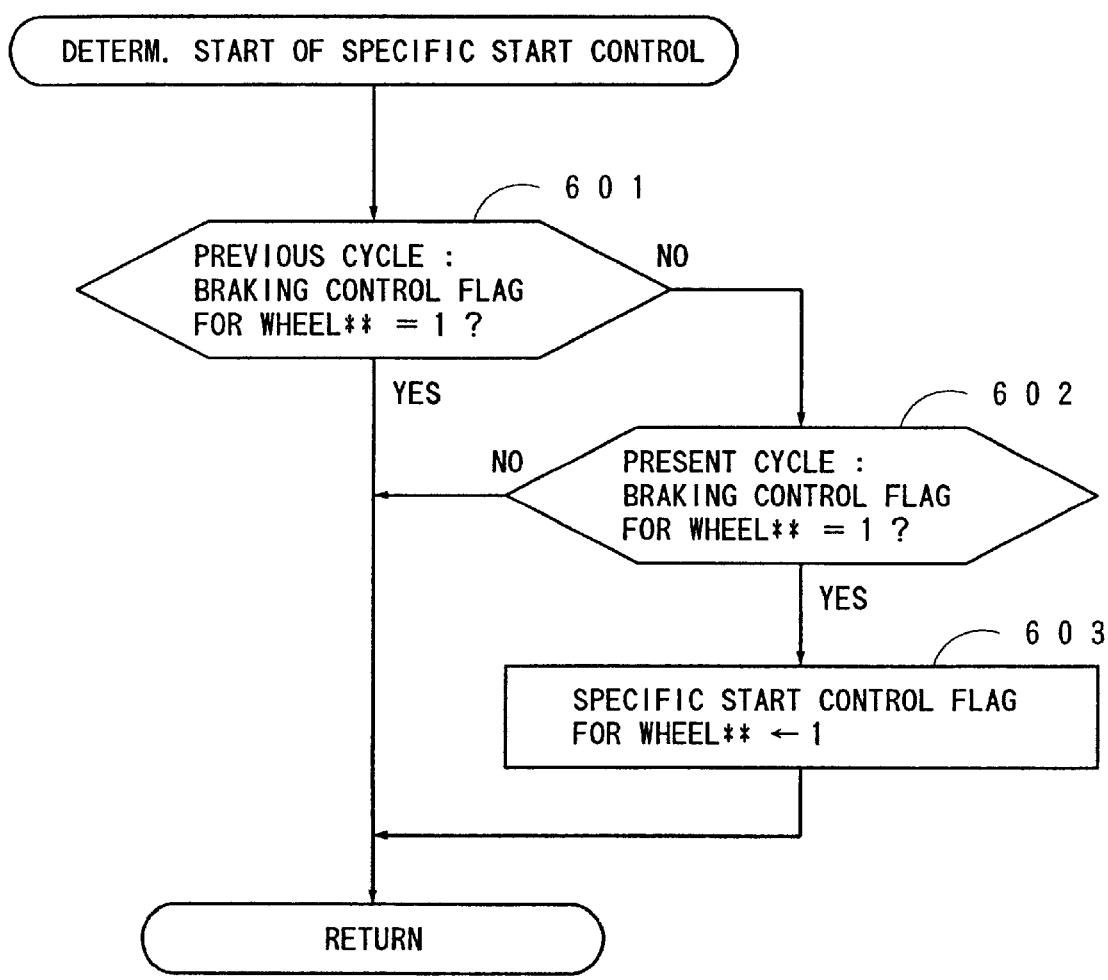
FIG. 8 is a flowchart showing a sub-routine for determining start of a specific start control in the braking control performed in the flowchart as shown in FIG. 4.

FIG. 8 shows the determination of starting the specific start control executed at Step 110 in FIG. 4. At Step 601, the braking control flag for the wheel  in the previous cycle is determined. If it is determined at Step 601 that the braking control flag was not set for the wheel  in the previous cycle, the program proceeds to Step 602, where the state of the braking control flag in the present cycle is determined. If it is determined that the braking control flag, which was not set in the previous cycle, is set in the present cycle, it means that it is immediately after the braking control started. Therefore, the program proceeds to Step 603, where a specific start control flag for the wheel ** is set. If it is determined that the braking control flag was set in the previous cycle, or if it is determined that the braking control flag has not been set in the present cycle, then the program returns to the main routine.

Figure 9:
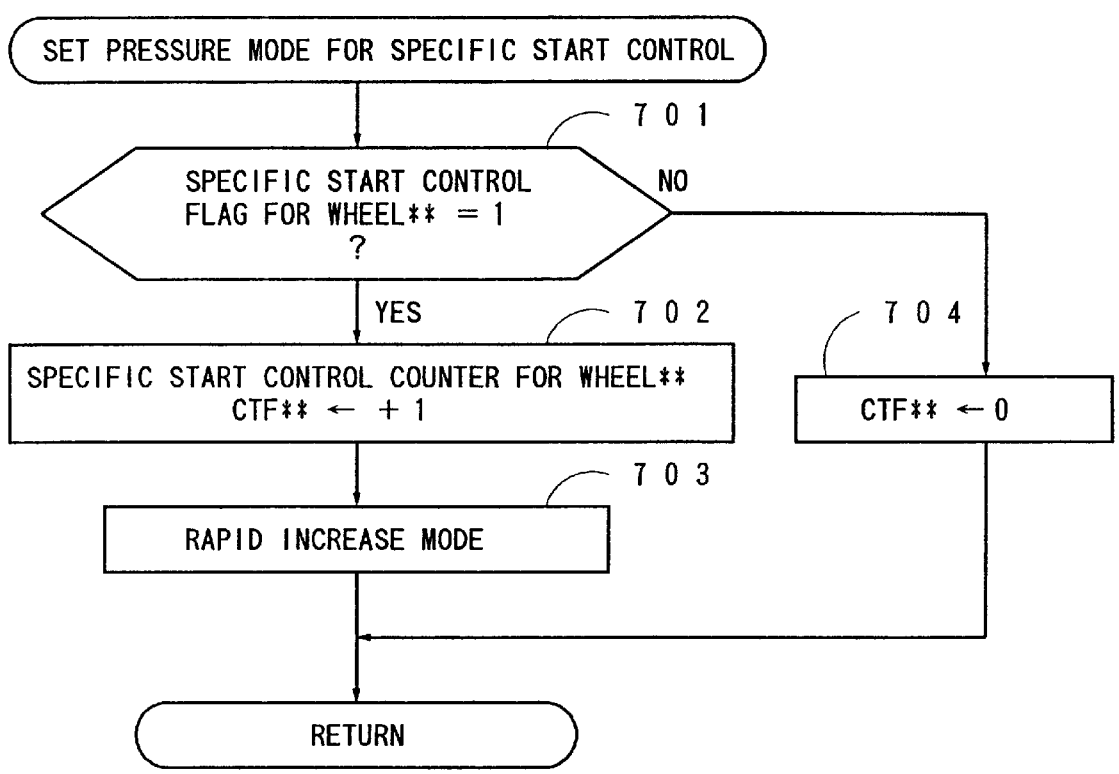
FIG. 9 is a flowchart showing a sub-routine for setting pressure modes for the specific start control in the braking control performed in the flowchart as shown in FIG. 4.

FIG. 9 shows the routine for setting a pressure mode for the specific start control, which is executed at Step 111 in FIG. 4. At the outset, the state of the specific start control flag for the wheel  is determined at Step 701. If the specific start control flag for the wheel  has been set, the program proceeds to Step 702, where the specific start control counter CTF for the wheel  is incremented (+1), then proceeds to Step 703, where the pressure mode for the wheel to be controlled (RR or RL) is set to be the rapid increase mode. If it is determined at Step 701 that the specific start control flag for the wheel  has not been set, the program proceeds to Step 704, where the specific start control counter CTF is cleared to be zero, and then the program returns to the main routine.

Figure 10:
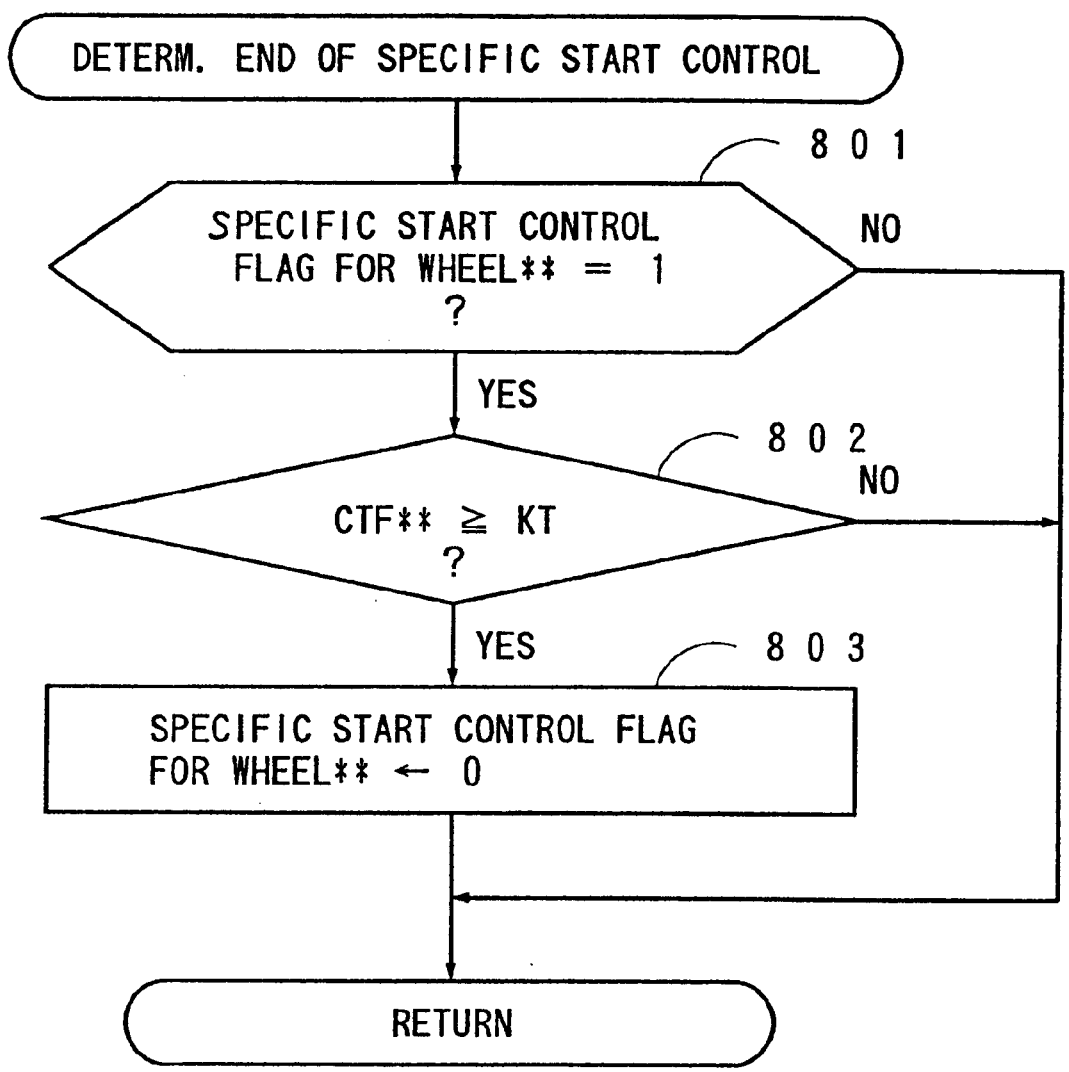
FIG. 10 is a flowchart showing a sub-routine for determining termination of the specific start control in the braking control performed in the flowchart as shown in FIG. 4.

FIG. 10 shows the determination of ending the specific start control executed at Step 112 in FIG. 4. At Step 801, it is determined whether a specific start control flag for one of the wheels  is set, or not. If the flag has not been set, the program returns to the main routine. If the flag is set, the program proceeds to Step 802, where the specific start control counter CTF for the wheel *i is compared with a predetermined time KT. If it is determined that the specific start control counter CTF has counted the predetermined time KT, the program proceeds to Step 803, where the specific start control flag for the wheel  is reset to be zero. If it is determined at Step 801 that the specific start control flag for the wheel  is reset, or if it is determined at Step 802 that the specific start control counter CTF has not counted the predetermined time KT, the program returns to the main routine.

Figure 11:
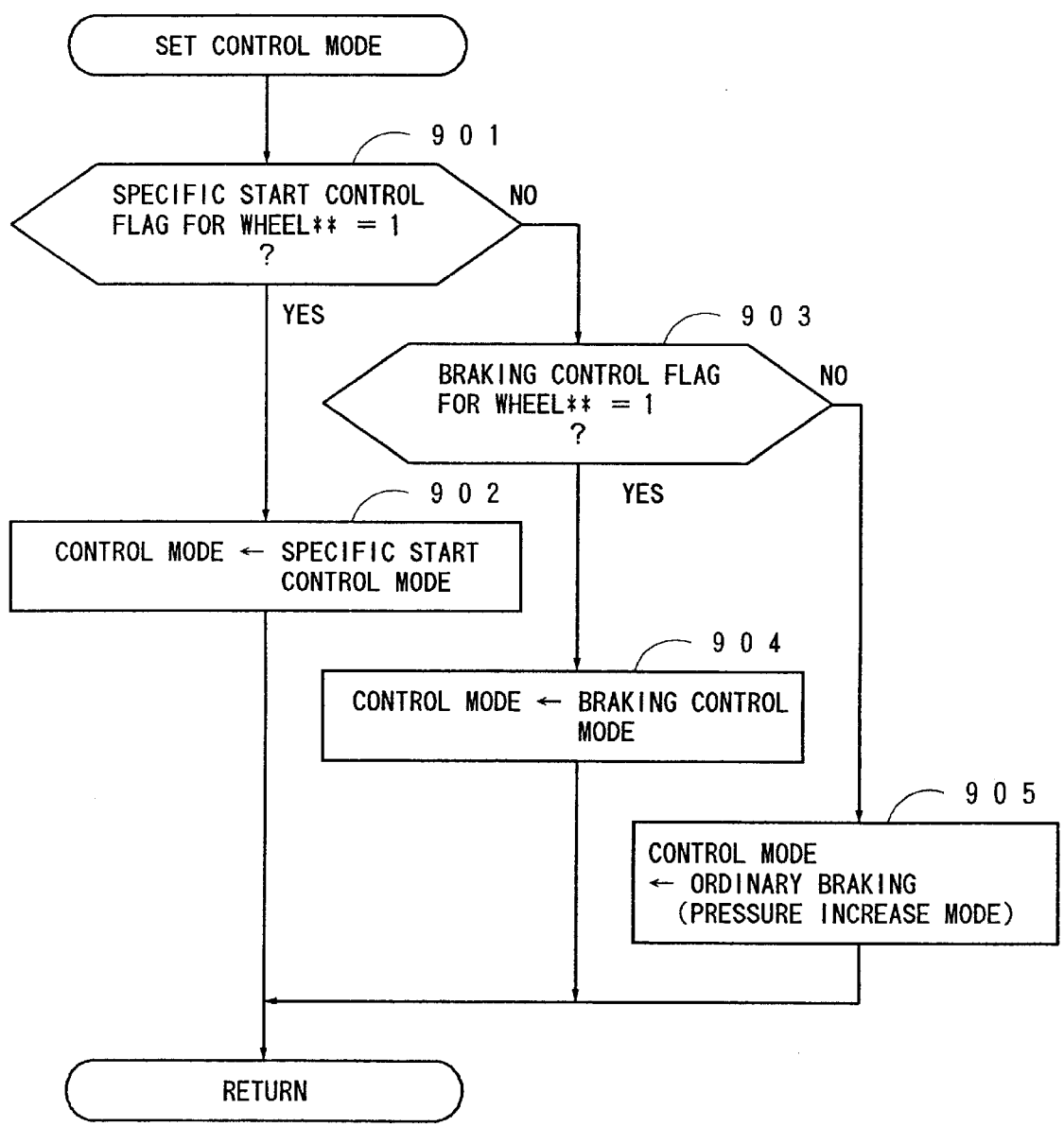
FIG. 11 is a flowchart showing a sub-routine for setting control modes for the braking control performed in the flowchart as shown in FIG. 4.

FIG. 11 shows the routine for setting the control mode executed at Step 113 in FIG. 4. At Step 901, it is determined whether the specific start control flag for one of the wheels  is set, or not. If the specific start control flag for the wheel  has been set, the program proceeds to Step 902, where the control mode is set to the specific start control mode. If the specific start control flag for the wheel  has not been set, the program further proceeds to Step 903, where it is determined whether the braking control flag for the wheel  is set, or not. If 'the result of the determination at Step 903 is affirmative, the program proceeds to Step 904, where the control mode is set to the braking control mode. If the braking control flag for the wheel  has not been set, the program further proceeds to Step 905, where the control mode is set to the pressure increase mode (i.e., in the ordinary braking operation). FIG. 11 shows the relationship between the braking control according to the present embodiment and the specific start control, while other control modes such as the traction control mode and the anti-skid control mode may be incorporated in FIG. 11**.

According to the present embodiment, therefore, in the case where the vehicle is moving upward on the rough road of steep slope, or moving backward, when the vehicle is stopped or parked, with the rear wheels RR, RL placed downward, the power pressure is discharged from the accumulator Acc to be supplied into the wheel brake cylinders Wrr, wrl, so that the wheel speeds of the wheels RR, RL can be easily reduced to be zero, the vehicle is held to be in its stopped state, without applying any excessive depressing force to the brake pedal BP.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A braking control system for controlling a braking force applied to each of front and rear wheels of an automotive vehicle, comprising:

front wheel brake cylinders operatively mounted on said front wheels for applying the braking force thereto, respectively;

rear wheel brake cylinders operatively mounted on said rear wheels for applying the braking force thereto, respectively;

pressure generating means for pressurizing brake fluid in response to operation of a manually operated member to generate a hydraulic braking pressure and supply the hydraulic braking pressure to each of said front and rear wheel brake cylinders;

an auxiliary pressure source for pressurizing the brake fluid irrespective of operation of said manually operated member to generate a power pressure;

braking operation detection means for detecting the operation of said manually operated member and the operating conditions thereof;

wheel speed detection means for detecting wheel speeds of said front and rear wheels of said vehicle;

slope detection means for determining whether said vehicle is on a slope, when the rear end of said vehicle is located downward;

stop holding means for holding the wheel speeds of said rear wheels to be zero by supplying the hydraulic braking pressure discharged from said auxiliary pressure source to said rear wheel brake cylinders, when said slope detection means determines that said vehicle is on the slope, with the rear end of said vehicle located downward, when said braking operation detection means detects the operation of said manually operated member, and when it is determined on the basis of the wheel speeds detected by said wheel speed detection means that the wheel speeds of said front wheels are zero and that the wheel speeds of said rear wheels are not zero; and stop cancellation means for decreasing the hydraulic braking pressure in said rear wheel brake cylinders in response to the operating conditions of said manually operated member detected by said braking operation detection means, when said vehicle is moved after said stop holding means had the wheel speeds of said rear wheels to be zero.

2. A braking control system as set forth in claim 1, wherein said pressure generating means includes:

static pressure generating means for pressurizing the brake fluid in response to operation of said manually operated member to generate a static hydraulic pressure and supply the static hydraulic pressure to said front wheel brake cylinders; and dynamic pressure generating means for regulating the power pressure discharged from said auxiliary power source to generate a dynamic hydraulic pressure in response to operation of said manually operated member and supply the dynamic hydraulic pressure to said rear wheel brake cylinders; and wherein said stop holding means includes changeover means for selectively placing one of a first operating position for communicating said rear wheel brake cylinders with said dynamic pressure generating means, and a second operating position for communicating said rear wheel brake cylinders with said auxiliary pressure source, said changeover means normally placing said first operating position, and placing said second operating position to supply the power pressure discharged from said auxiliary power source to said rear wheel brake cylinders, and keep the wheel speeds of said rear wheels to be zero, when said slope detection means determines that said vehicle is on the slope, with the rear end of said vehicle located downward, and said braking operation detecting means detects the operation of said manually operated member, and when it is determined on the basis of the wheel speeds detected by said wheel speed detection means that the wheel speeds of said front wheels are zero and that the wheel speeds of said rear wheels are not zero.

3. A braking control system as set forth in claim 2, wherein said braking operation detection means includes pressure detection means for detecting the hydraulic pressure output from said static pressure generating means, and wherein said braking operation detection means is adapted to detect the operating conditions of said manually operated member in response to a varying rate of the hydraulic pressure output from said static pressure generating means and detected by said pressure detection means.

4. A braking control system as set forth in claim 3, wherein said static pressure generating means includes a master cylinder for generating the hydraulic pressure in response to said manually operated member, wherein said pressure detection means includes a pressure sensor for detecting the hydraulic pressure generated from said master cylinder, and wherein said braking operation detection means is adapted to detect the operating conditions of said manually operated member in response to a gradient of the hydraulic pressure detected by said pressure sensor.

5. A braking control system as set forth in claim 4, wherein said braking operation detection means includes a brake switch which is turned on when said manually operated member is operated.

6. A braking control system as set forth in claim 1, wherein said vehicle is a four-wheel drive vehicle having a front differential gear connected to said front wheels, a rear differential gear connected to said rear wheels, and a center differential gear connected to said front and rear differential gears.

\* \* \* \* \*